(12) United States Patent
Park et al.

(10) Patent No.: US 12,553,949 B2
(45) Date of Patent: Feb. 17, 2026

(54) JIG FOR EVALUATING SAFETY OF SECONDARY BATTERY

(71) Applicant: LG ENERGY SOLUTION, LTD., Seoul (KR)

(72) Inventors: Sung Kwan Park, Seoul (KR); Duk Hyun Ryu, Seoul (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 73 days.

(21) Appl. No.: 18/572,617

(22) PCT Filed: Dec. 2, 2022

(86) PCT No.: PCT/KR2022/019515
§ 371 (c)(1),
(2) Date: Dec. 20, 2023

(87) PCT Pub. No.: WO2023/101515
PCT Pub. Date: Jun. 8, 2023

(65) Prior Publication Data
US 2024/0369636 A1 Nov. 7, 2024

(30) Foreign Application Priority Data

Dec. 3, 2021 (KR) .................... 10-2021-0171664

(51) Int. Cl.
*G01R 31/364* (2019.01)
*G01R 31/385* (2019.01)
(Continued)

(52) U.S. Cl.
CPC ....... *G01R 31/364* (2019.01); *G01R 31/3865* (2019.01); *H01M 10/4285* (2013.01); *H01M 50/383* (2021.01)

(58) Field of Classification Search
CPC ............ G01R 31/364; G01R 31/3865; H01M 50/383; H01M 10/4285
(Continued)

(56) References Cited

U.S. PATENT DOCUMENTS

2009/0317664 A1* 12/2009 Niessen .................. H01M 6/40
429/207
2013/0164579 A1 6/2013 Harii et al.
(Continued)

FOREIGN PATENT DOCUMENTS

CN 109541265 A 3/2019
CN 208647834 U 3/2019
(Continued)

OTHER PUBLICATIONS

Japanese Office Action for Japanese Application No. 2024-501913, dated Jan. 14, 2025, with English translation.
(Continued)

*Primary Examiner* — Huy Q Phan
*Assistant Examiner* — Trung Q Nguyen
(74) *Attorney, Agent, or Firm* — Birch, Stewart, Kolasch & Birch, LLP (57) ABSTRACT

A jig for evaluating stability of a battery cell includes a jig part including first and second terminal pins configured to come into contact with external terminals of the battery cell, and a plate positioned to face the jig part and configured to support the battery cell, in which the jig part includes the first and second terminal pins configured to come into contact with the battery cell, and a main body configured to be separated from or coupled to at least any one of the first and second terminal pins.

11 Claims, 6 Drawing Sheets

(51) Int. Cl.
*H01M 10/42* (2006.01)
*H01M 50/383* (2021.01)

(58) Field of Classification Search
USPC .............. 324/500, 600, 76.11, 423–430
See application file for complete search history.

(56) References Cited

U.S. PATENT DOCUMENTS

| | | | |
|---|---|---|---|
| 2014/0210413 | A1 | 7/2014 | Yoon et al. |
| 2016/0093844 | A1* | 3/2016 | Kamiya .............. H01M 50/578 |
| | | | 429/99 |
| 2018/0095020 | A1 | 4/2018 | Noh et al. |
| 2018/0159120 | A1* | 6/2018 | Hirama ................ H01M 4/386 |
| 2020/0400747 | A1 | 12/2020 | Min et al. |
| 2021/0013481 | A1* | 1/2021 | Kuwata ............... H01M 50/244 |
| 2021/0057681 | A1* | 2/2021 | Lee .................... H01M 50/531 |
| 2022/0337072 | A1* | 10/2022 | Kim ..................... H05K 7/1417 |
| 2023/0093445 | A1* | 3/2023 | Kim .................. G01R 31/3644 |
| | | | 324/437 |
| 2024/0103082 | A1 | 3/2024 | Lee et al. |

FOREIGN PATENT DOCUMENTS

| | | |
|---|---|---|
| CN | 210427752 U | 4/2020 |
| CN | 213302293 U | 5/2021 |
| JP | 11-83960 A | 3/1999 |
| JP | 11-149945 A | 6/1999 |
| JP | 2001-6754 A | 1/2001 |
| JP | 2001-35502 A | 2/2001 |
| JP | 2001-291531 A | 10/2001 |
| JP | 2008-39459 A | 2/2008 |
| JP | 2009-104925 A | 5/2009 |
| JP | 2010-231963 A | 10/2010 |
| JP | 2017-98014 A | 6/2017 |
| JP | 2017-161334 A | 9/2017 |
| JP | 2019-46639 A | 3/2019 |
| KR | 10-0219187 B1 | 9/1999 |
| KR | 20-0225054 Y1 | 5/2001 |
| KR | 10-2006-0100485 A | 9/2006 |
| KR | 10-2012-0053152 A | 5/2012 |
| KR | 10-1192059 B1 | 10/2012 |
| KR | 10-1411233 B1 | 6/2014 |
| KR | 10-2014-0097929 A | 8/2014 |
| KR | 10-1432523 B1 | 8/2014 |
| KR | 10-2015-0037189 A | 4/2015 |
| KR | 10-2316702 B1 | 10/2021 |
| WO | WO2021/112430 A1 | 6/2021 |

OTHER PUBLICATIONS

International Search Report for PCT/KR2022/019515 (PCT/ISA/210) mailed on Mar. 23, 2023.
Extended European Search Report for European Application No. 22901873.4, dated Apr. 3, 2025.
Japanese Office Action for Japanese Application No. 2024-501913, dated Aug. 5, 2025, with English translation.
European Communication pursuant to Article 94(3) EPC for European Application No. 22 901 873.4, dated Nov. 27, 2025.

* cited by examiner

JIG FOR EVALUATING SAFETY OF SECONDARY BATTERY

CROSS REFERENCE TO RELATED APPLICATION

This application claims priority to and the benefit of Korean Patent Application No. 10-2021-0171664 filed with the Korean Intellectual Property Office on Dec. 3, 2021, the entire contents of which are incorporated herein by reference.

TECHNICAL FIELD

The present invention relates to a jig for evaluating safety of a secondary battery. Specifically, the present invention relates to a jig used to evaluate safety of a large-scale secondary battery.

BACKGROUND ART

Recently, there has been a rapidly increasing demand for portable electronic products such as notebook computers, video cameras, and mobile phones, and research and development have been actively conducted on electric vehicles, energy storage batteries, robots, satellites, and the like. Therefore, studies are being actively conducted on high-performance secondary batteries that may be repeatedly charged and discharged.

As currently commercially available secondary batteries, there are a nickel cadmium battery, a nickel hydrogen battery, a nickel zinc battery, a lithium secondary battery, and the like. Among these batteries, in comparison with the nickel-based secondary battery, the lithium secondary battery causes almost no memory effect and thus is freely charged or discharged. Further, the lithium secondary battery has a very low self-discharge rate and a high energy density, and due to these advantages, the lithium secondary battery is in the limelight.

In general, unlike a primary battery that cannot be recharged, the secondary battery means a battery that may be charged and discharged. The secondary batteries are being widely used for electronic devices such as mobile phones, notebook computers, camcorders, and the like or electric vehicles. In particular, because a lithium secondary battery has a larger capacity and higher energy density per unit weight than a nickel-cadmium battery or a nickel-hydrogen battery, there is a rapidly increasing use of the lithium secondary battery.

The lithium secondary battery mainly uses lithium-based oxide and carbon materials for a positive electrode active material and a negative electrode active material. The lithium secondary battery includes: an electrode assembly including a positive plate and a negative plate that are respectively coated with the positive electrode active material and the negative electrode active material and disposed with a separator interposed therebetween; and an exterior material configured to seal and accommodate the electrode assembly together with an electrolyte.

Meanwhile, the lithium secondary batteries are manufactured in various shapes such as a cylindrical shape, an angular shape, a pouch type, and the like. As the electrode assemblies adopted in the cylindrical secondary batteries, there is a jelly-roll-type electrode assembly made by a process of inserting a separator sheet between negative and positive electrode sheets made by applying an active material onto a current collector, drying the active material, and then performing roll-pressing and cutting on the current collector and a process of winding the assembly of the separator sheet and the negative and positive electrode sheets.

In general, in the cylindrical secondary battery, the jelly roll, which is made by winding the assembly of the negative and positive electrode sheets and the separator sheet in a circular shape, is accommodated in a battery casing. In the angular or pouch-type battery, the jelly roll, which is made by winding the assembly of the negative and positive electrode sheets and the separator sheet in an elliptical shape, is flattened by being pressed and then accommodated in a battery casing.

Further, a positive electrode lead, which is welded to a positive electrode current collector of the electrode assembly, is electrically connected to a cap assembly and connected to a protruding terminal provided at an upper end of a top cap. A negative electrode lead, which is welded to a negative electrode current collector, is welded to a sealed end of the casing, such that the casing constitutes a negative electrode terminal by itself. A material of the casing is not particularly limited. The material of the casing may be any one of stainless steel, steel, aluminum, or an equivalent thereof. An electrolyte is injected in the state in which the electrode assembly is accommodated in the casing, and a cap assembly is mounted at an open end of the casing and seals the open end of the casing, such that the cylindrical secondary battery is completely assembled.

To evaluate whether the cylindrical secondary battery is safe even though the cylindrical secondary battery is charged and discharged multiple times, positive and negative electrode tabs are welded to a secondary battery external terminal, the positive and negative electrode tabs are connected to a charging/discharging apparatus, and then stability evaluation is performed.

However, because the size of the cylindrical secondary battery increases, the amount of electric current applied to charge and discharge the cylindrical secondary battery increases. For this reason, there is a problem in that the electrode tab welded to the secondary battery external terminal is disconnected by heat generated by the large amount of electric current.

DETAILED DESCRIPTION OF THE INVENTION

Technical Problem

The present invention has been made in an effort to solve the above-mentioned problem in the related art, and an object of the present invention is to provide a jig used to evaluate safety of a large-scale secondary battery.

Technical Solution

An embodiment of the present invention provides a jig for evaluating stability of a battery cell, the jig including: a jig part including first and second terminal pins configured to come into contact with external terminals of the battery cell; a main body, at least one of the first and second terminals being configured to be separated from or coupled thereto; and a plate positioned to face the jig part and configured to support the battery cell.

In the embodiment of the present invention, the external terminals of the battery cell may include a positive electrode terminal part and a negative electrode terminal part, and the first and second terminals may be configured to come into contact with the positive electrode terminal part and the negative electrode terminal part of the battery cell, respectively.

In the embodiment of the present invention, the battery cell may include: an electrode assembly made by winding a separator and electrodes; a can configured to accommodate the electrode assembly and opened at a first side thereof, the can having a through-hole at a second side thereof; a vent coupled to the opening; and a second electrode terminal coupled to the through-hole, the second electrode terminal being one of the external terminals, and any one of the first and second terminal pins may have a diameter equal to or smaller than a diameter of the second electrode terminal.

In the embodiment of the present invention, the at least one of the first and second terminal pins may be separated from and coupled to the main body in a screwed manner.

In the embodiment of the present invention, the plate may include an ignition discharge port configured to discharge flame and heat therethrough.

In the embodiment of the present invention, the jig may further include: a plate controller configured to bring the cell into contact with the jig part or separate the cell from the jig part by adjusting a position of the plate.

In the embodiment of the present invention, the jig may further include: a connection part coupled to the jig part and configured to electrically connect the cell to a stability evaluation apparatus.

In the embodiment of the present invention, the connection part may include at least one of a first terminal pin connection part connected to the first terminal pin of the jig part and a second terminal pin connection part connected to the second terminal pin of the jig part.

In the embodiment of the present invention, the plate may be provided as a plurality of plates.

In the embodiment of the present invention, the jig may further include: a mounting part configured to come into contact with at least a part of the cell to support the cell.

In the embodiment of the present invention, the mounting part may be configured to come into contact with at least a part of a lateral surface of the cell to support the cell.

Advantageous Effects

According to the jig for evaluating safety of a secondary battery according to the embodiment of the present invention, the plate configured to support the cell may be used to bring the external terminal of the cell into contact with the terminal pin of the jig, such that a process of welding the terminal of the cell and the terminal pin of the jig may be eliminated.

Further, the present invention may prevent a problem in that the welded portion between the external terminal of the cell and the terminal pin of the jig is heated by a large amount of electric current occurring at the time of charging and discharging the cell to evaluate safety of the secondary battery, and the external terminal of the cell and the terminal pin of the jig are disconnected.

EXPLANATION OF REFERENCE NUMERALS AND SYMBOLS

100: Jig for evaluating safety of secondary battery
10: Mounting part
20: Jig part
21: First terminal pin
22: Second terminal pin
30: Plate
31: Ignition discharge port
40: Plate controller
50: Connection part
51: First terminal connection part
52: Second terminal connection part
200: Cell, secondary battery
1: Electrode assembly
2: Can
2a: Beading portion
2b: Crimping portion
3: Vent
3a: Vent notch
4: First current collecting plate
4b: First electrode terminal
5a: Second current collecting plate
5b: Second electrode terminal
5c: Second electrode gasket
C: Core part
G: Gasket
S: Insulator

BEST MODE

The detailed description of the present invention is provided to completely explain the present invention to a person with ordinary skill in the art. Throughout the specification, unless explicitly described to the contrary, when one component "comprises (includes)" another component or "characterized by" having a certain structure and a certain shape, this means that other components, structures, and shapes may be included without being excluded.

The present invention may be variously modified and may have various exemplary embodiments, and specific exemplary embodiments will be described in detail in the detailed description. However, the description of the exemplary embodiments is not intended to limit the contents of the present invention, but it should be understood that the present invention is to cover all modifications, equivalents and alternatives falling within the spirit and technical scope of the present invention.

Hereinafter, the present invention will be described in detail with reference to the drawings. However, the drawings are intended to illustratively describe the present invention, and the scope of the present invention is not limited by the drawings.

Figure 1:
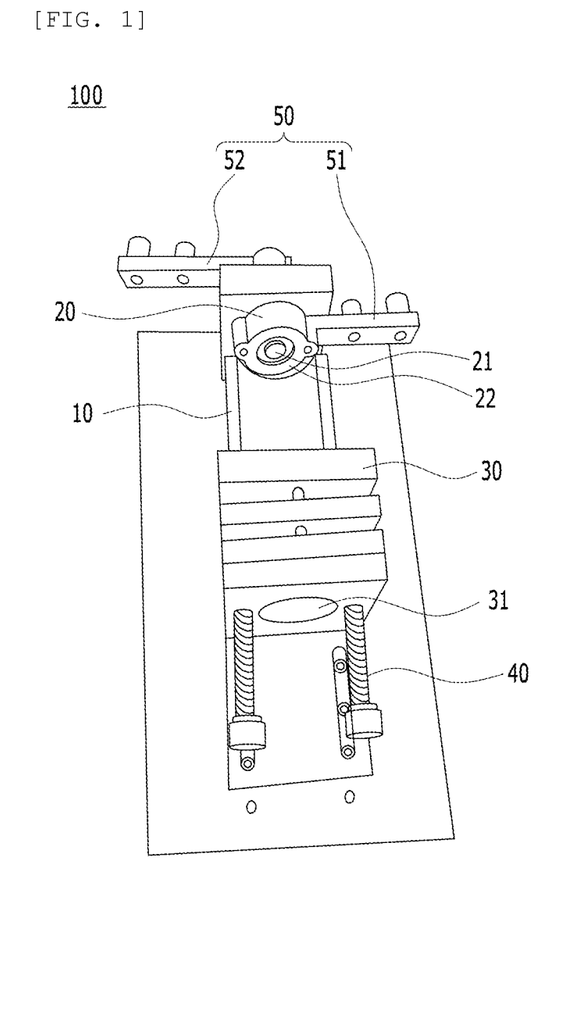
FIG. 1 is a photograph of a jig for evaluating stability of a secondary battery according to an embodiment of the present invention.
Figure 2A:
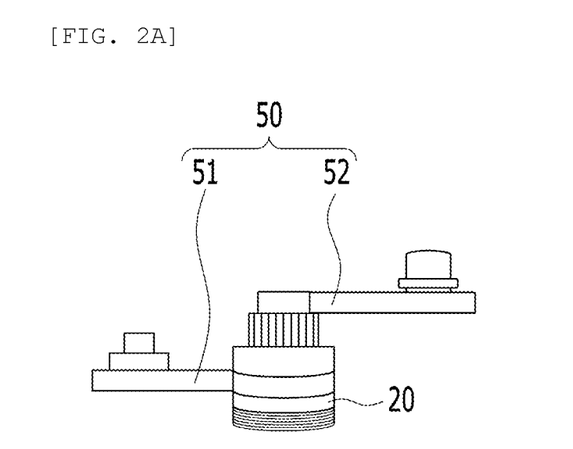
FIG. 2A is an elevation view of a lateral surface of a jig part according to the embodiment of the present invention.
Figure 2B:
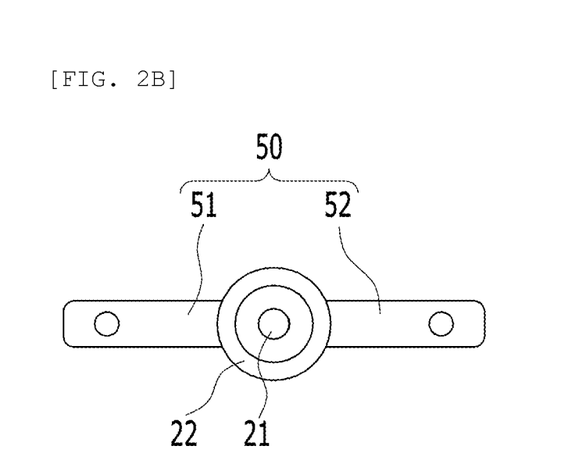
FIG. 2B is a view of a rear surface of the jig part according to the embodiment of the present invention.
Figure 3:
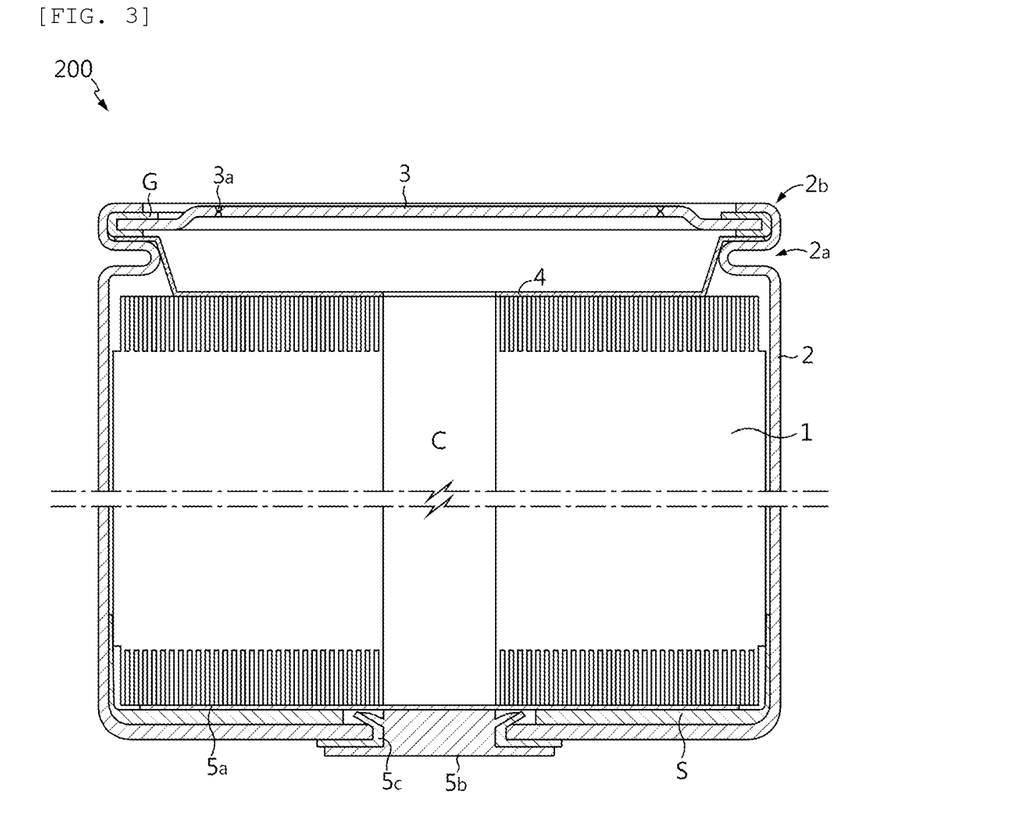
FIG. 3 is a cross-sectional view illustrating a cell according to the embodiment of the present invention.

FIG. 1 is a photograph of a jig for evaluating stability of a secondary battery according to an embodiment of the present invention, FIG. 2A is an elevation view of a lateral surface of a jig part according to the embodiment of the present invention, FIG. 2B is a plan view of a rear surface of the jig part according to the embodiment of the present invention, and FIG. 3 is a cross-sectional view illustrating a cell 200 according to the embodiment of the present invention.

A jig 100 for evaluating stability of a secondary battery according to the present invention intentionally makes ignition and analyzes flame durations and temperatures of a secondary battery 200 to evaluate safety of the secondary battery. The jig 100 for evaluating stability of a secondary battery includes a jig part 20 and a plate 30.

The cell 200 according to the present invention may include the secondary battery. In the embodiment, the cell may include: an electrode assembly 1, a can 2 configured to accommodate the electrode assembly 1; a plurality of current collecting plates (a positive electrode current collecting plate and a negative electrode current collecting plate (not illustrated)) respectively positioned at one side and the other side of the electrode assembly 1; and a vent 3 configured to seal the can 2.

The electrode assembly 1 is a power generation element configured to be chargeable and dischargeable and having a stacked structure including electrodes (not illustrated) and a separator (not illustrated). The electrode assembly 1 may include a jelly-roll-type structure made by winding the elongated sheet-type electrodes, which are each coated with an active material, in a state in which the separator is interposed between the electrodes.

For example, the electrodes may include a negative electrode and a positive electrode. The negative electrode, the separator, and the positive electrode may be sequentially stacked to constitute the electrode assembly 1. Further, the electrode assembly 1 according to the present invention may be made by stacking a plurality of electrode assemblies 1 each made by sequentially stacking the negative electrode, the separator, and the positive electrode.

In the electrode assembly 1 according to the embodiment, an active material portion (not illustrated), which is made by applying an active material onto the electrode, may be positioned in a longitudinal direction of a current collector of the electrode. Non-coated portions (not illustrated), on which no active material is applied, may be positioned at two opposite lateral sides of the active material portion, i.e., two opposite lateral sides of the active material portion positioned in the longitudinal direction of the active material portion. In this case, a length of the current collector may mean a length in a direction in which a distance between two opposite ends is longest when the wound electrode assembly 1 is unwound.

The active materials may include a positive electrode active material and a negative electrode active material. The positive electrode active material may include lithium cobalt oxide having high working voltage and excellent capacity characteristics, lithium nickel oxide having high reversible capacity and used to easily implement a high-capacity battery, lithium nickel cobalt oxide made by substituting a part of nickel with cobalt, lithium nickel cobalt metal oxide made by substituting a part of nickel with manganese, cobalt, or aluminum, lithium manganese-based oxide having excellent thermal stability and made with low costs, and lithium iron phosphate having excellent stability.

For example, the negative electrode active material may be crystalline carbon, amorphous carbon, carbon composite, carbon material such as carbon fiber, lithium metal, lithium alloy, or the like. In this case, for example, the negative electrode active material may further include non-graphite-based SiO (silica), SiC (silicon carbide), or the like to design a high capacity.

In the electrode assembly 1, the non-coated portions, which are positioned at two opposite ends of the electrode wound around an outermost periphery of the electrode assembly 1 in a direction opposite to a winding center part (or a core part), may be notched and bent toward a central portion of the electrode assembly 1. Alternatively, the entire non-coated portion wound around the electrode assembly 1 may be notched, and then the notched portion may be bent in a direction toward an outer periphery of the electrode assembly 1.

In another embodiment, the electrode may include the non-coated portion and the active material portion provided on one surface of the current collector. The non-coated portion may be positioned at one of or both two opposite ends of one surface of the current collector or positioned in an intermediate region.

Further, an electrode tab (not illustrated) may be provided on at least a part of one surface of the non-coated portion. A part of the electrode tab may be in contact with the non-coated portion, and another part of the electrode tab may be positioned to protrude in a direction of a width (W) of the current collector. The electrode tab may transfer electrons, which are collected on the current collector, to an external circuit.

In the secondary battery 200 according to the present invention, the electrode assembly 1 may have a core part C formed at a center of the electrode assembly 1 by removing a mandrel. Further, the secondary battery 200 may further include a center pin (not illustrated) disposed in the core part C. The center pin may prevent the electrode assembly 1 wound in the jelly-roll shape from being loosened, and the center pin may serve as a movement passage for gas in the cylindrical secondary battery.

The can 2 may have a column structure having a space therein. The internal space of the can 2 may accommodate an electrolyte (not illustrated) and the electrode assembly 1 including the electrodes and the separator. The can 2 may have a structure opened at one side thereof and have a through-hole (not illustrated) provided at the other side thereof. The through-hole may have a circular or polygonal shape. A diameter or width of the through-hole may be less than a diameter of the can 2. In this case, one side and the other side of the can 2 may mean ends positioned on the upper and lower portions in the gravitational direction or along the central axis of the can 2.

The can 2 according to the present invention may have a column shape having a constant diameter. Alternatively, the can 2 may have a column shape having a diameter that decreases or increases in an axial direction of the can 2.

The can 2 according to the present invention may include a beading portion 2a and a crimping portion 2b which the vent 3 and a first current collecting plate 4 are stacked on and fixed to. The beading portion 2a may be formed in a region adjacent to one open side of the can 2 and have a shape press-fitted into the can 2. Further, the crimping portion 2b may be formed by pressing an outer wall of an upper end of the can 2, which is not press-fitted, toward the central portion of the can 2.

Further, the secondary battery 200 according to the present invention may further include a gasket G configured to increase sealability between an inner surface of the crimping portion 2b, the first current collecting plate 4, and an end of the vent 3.

The can 2 may be made of a lightweight conductive metallic material such as aluminum or aluminum alloy. A diameter of a circle of each of the two opposite ends of the can 2 may be 30 mm to 55 mm, and a height of the can may be 60 mm to 120 mm. For example, a value of circular diameter×height of the cylindrical can may be 40 mm×60 mm, 40 mm×80 mm, 40 mm×90 mm, or 40 mm×120 mm.

The vent 3 is a thin-film structure through which the electric current flows. The vent 3 may be positioned in the opening of the can 2. In the embodiment, a diameter of the vent 3 may be equal to an inner diameter of the can 2. The vent 3 may include a first surface facing the first current collecting plate, and a second surface opposite to the first surface. A lateral surface of the vent 3 may be in contact with the inner surface of the can 2. The lateral surface of the vent 3 may be welded to the contact surface of the can 2, such that the can 2 and the vent may be fixed. In this case, the lateral surface of the vent 3 is a surface that connects the first surface and the second surface and means a surface positioned to be perpendicular to the first surface and the second surface.

The vent 3 may protrude downward in a direction from an edge toward a central portion. In other words, the vent 3 may protrude stepwise toward the first current collecting plate in the direction from the edge toward the central portion.

The vent 3 may include one or more vent notches 3a that are ruptured when a pressure in the can 2 exceeds a critical value. The vent notches 3a may be provided in one or more of the first and second surfaces of the vent 3. The vent notches 3a may be provided in a continuous or discontinuous circular pattern, a straight pattern, or other patterns on the surface of the vent 3. A depth, a width, and the like of the vent notch 3a may be set so that the vent notch 3a may be ruptured when the pressure in the can 2 is within a range of 15 kgf/cm$^2$ to 35 kgf/cm$^2$.

The first current collecting plate 4 may be provided on one surface of the electrode assembly 1, positioned between the electrode assembly 1 and the vent 3, and electrically connected to the electrode assembly 1 and the vent 3.

A second current collecting plate 5a may be provided at a position opposite to the first current collecting plate 4.

The second current collecting plate 5a may be provided at the position opposite to the first current collecting plate 4. Further, the secondary battery 200 according to the present invention may further include an insulator S provided between the second current collecting plate 5a and the can 2.

The first current collecting plate 4 may further include a first electrode terminal (not illustrated). The second current collecting plate 5a may include a second electrode terminal 5b. The first and second electrode terminals 5b may each be made of a conductive metallic material. For example, the first and second electrode terminal 5b may each be made of, but not limited to, aluminum.

The second electrode terminal 5b may be coupled to the through-hole of the can 2 and electrically connected to the electrode assembly 1. The second electrode terminal 5b may have a different polarity from the can 2. For example, when the can 2 has a negative polarity, the second electrode terminal 5b may have a positive polarity.

The secondary battery 200 according to the present invention may include a second terminal gasket 5c provided between the second electrode terminal 5b and an inner surface of the through-hole to allow the second electrode terminal 5b to have a different polarity from the can 2. The second terminal gasket 5c may be made of polymer resin having insulation and elasticity, thereby preventing contact between the second electrode terminal 5b and the can 2.

For example, the second terminal gasket 5c may be made of polypropylene, polybutylene terephthalate, polyfluorinated ethylene, or the like. However, the present invention is not limited thereto.

The jig part 20 may include one or more first terminal pins 21 and one or more second terminal pins 22 that are in contact with the external terminal of the cell. In the embodiment, a mounting part 10 may be in contact with the lateral surface of the cell 200, and one surface of the jig part 20 may be positioned to be perpendicular to the mounting part 10.

The cell 200 according to the present invention may include the external terminal, and the external terminal may include a first terminal part and a second terminal part. In the embodiment, referring to FIG. 3, the first terminal part may be the second electrode terminal 5b, and the second terminal part may be the can 2, i.e., the can 2 that surrounds the second electrode terminal 5b.

The jig part 20 may include the first terminal pin 21 and the second terminal pin 22. The first terminal pin 21 and the second terminal pin 22 may be respectively in contact with the first terminal part and the second terminal part of the cell. When the first terminal pin 21 is a positive electrode terminal and the second terminal pin 22 is a negative electrode terminal, the first terminal pin 21 may be in contact with the second electrode terminal 5b of the cell 200, and the second terminal pin 22 may be in contact with the can 2 of the cell 200.

The second electrode terminal 5b may be configured as a protruding portion having a diameter smaller than a diameter of the cell. Therefore, the first terminal pin 21 or the second terminal pin 22, which is in contact with the second electrode terminal 5b, may have a diameter equal to or smaller than a diameter of the second electrode terminal 5b. In this case, the diameter of the second electrode terminal 5b, the diameter of the first terminal pin 21, and the diameter of the second terminal pin 22 respectively mean the size of the second electrode terminal 5b, the size of the first terminal pin 21, and the size of the second terminal pin 22. For example, when the second electrode terminal 5b, the first terminal pin 21, and the second terminal pin 22 each have a circular shape, the diameter may mean a diameter distance. When the second electrode terminal 5b, the first terminal pin 21, and the second terminal pin 22 each have a polygonal shape other instead of a circular shape, the diameter may mean a length of an outer periphery of the polygonal shape.

In the jig part 20 according to another embodiment, one of or both the first terminal pin 21 and the second terminal pin 22 may be separated.

The jig part 20 may include the first and second terminal pins 21 and 22, which are configured to come into contact with the terminal parts of the cell, and a main body from/to which one of or both the first terminal pin 21 and the second terminal pin 22 are separated/coupled. For example, when the first terminal pin 21 is a positive electrode terminal pin and the second terminal pin is a negative electrode terminal pin, the second terminal pin 22 may be fixed to the main body of the jig part 20, and only the first terminal pin 21 may be separated from or coupled to the main body. Alternatively, both the first terminal pin 21 and the second terminal pin 22 may be separated from or coupled to the main body of the jig part 20.

One of or both the first terminal pin 21 and the second terminal pin 22 may be separated from or coupled to the main body in a screwed manner. For example, one or more grooves each having a screw thread may be provided in one surface of the main body. A coupling portion, which protrudes and has a screw thread provided on an outer surface thereof, may be provided on one surface of each of the first terminal pin 21 and the second terminal pin 22. Therefore, the groove of the main body and the coupling portion of the first terminal pin 21 or the second terminal pin 22 may be separated from or coupled to each other by means of a screw structure.

The jig part 20 may be made by plating brass with gold. Further, an O-ring may be applied to the jig part 20 to reduce contact resistance.

The plate 30 may be positioned at the other side of the mounting part 10 and support the cell 200. The plate 30 may be positioned in a direction opposite to the jig part 20 based on the cell.

The plate 30 may include an ignition discharge port 31. When the secondary battery is charged or discharged to evaluate safety of the secondary battery, a thermal runaway may occur while charging or discharging the secondary battery, which may cause flame and high-temperature heat. The ignition discharge port 31 may discharge flame and high-temperature heat generated in the cell to the outside.

Because the jig 100 for evaluating stability of a secondary battery according to the present invention has the ignition discharge port 31, it is possible to prevent the occurrence of chain ignition and side rupture by discharging flame through the ignition discharge port 31 even though the plurality of batteries is simultaneously evaluated.

A diameter of the ignition discharge port 31 may be equal to or smaller than a diameter of the cell mounted on the jig 100 for evaluating stability of a secondary battery according to the present invention. The crimping portion 2b of the can 2 may be mounted on a portion of the plate 30, where the ignition discharge port 31 is not provided, and support the can 2. Therefore, the plate 30 may support the cell even though the ignition discharge port 31 and the can 2 have the same diameter.

In the embodiment, a diameter of the ignition discharge port 31 may be 1 mm to 10 mm or less. In particular, the ignition discharge port 31 may have a diameter of 2 mm to 8 mm, more particularly, 2 mm to 5 mm.

Because the ignition discharge port 31 satisfies the numerical value range, it is possible to support the cell 200 and effectively discharge ignition heat in the event of ignition of the cell 200, thereby maintaining the constant temperature of the cell 200. In other words, it is possible to prevent a problem in that the ignition discharge port 31 is large, and the cell 200 passes through the ignition discharge port 31 at the time of moving the plate 30 and supporting the cell 200. Further, it is possible to prevent a problem in that the ignition discharge port 31 is small, and ignition heat cannot be discharged to the ignition discharge port 31 or a large amount of time is required to discharge ignition heat to the outside through the ignition discharge port 31.

One or more plates 30 may be provided. In the present specification, the term "one or more" may mean including one component or include two or more components. When the plurality of plates 30 is provided, a plate coupling portion may be further provided to connect the plurality of plates. In case that the plurality of plates 30 is provided, all the plates 30 may have the ignition discharge port 31.

The jig 100 for evaluating safety of the secondary battery according to the present invention may further include a plate controller 40 configured to bring the cell into contact with the jig part 20 or separate the cell from the jig part 20 by adjusting a position of the plate 30. In more detail, the plate controller 40 may adjust a height of the plate 30. When the plate controller 40 adjusts the position of the plate 30 in a direction toward the jig part 20, the terminal parts of the cell may come into contact with the first terminal pin 21 and the second terminal pin 22 of the jig part.

For example, the plate controller 40 may include a column having a screw thread provided on an outer surface thereof, and a bolt screw-coupled to the column and configured to adjust a height of the plate 30. Further, in case that the plurality of plates 30 is provided, the plate controller 40 may be an extension portion of the plate coupling portion.

Figure 4A:
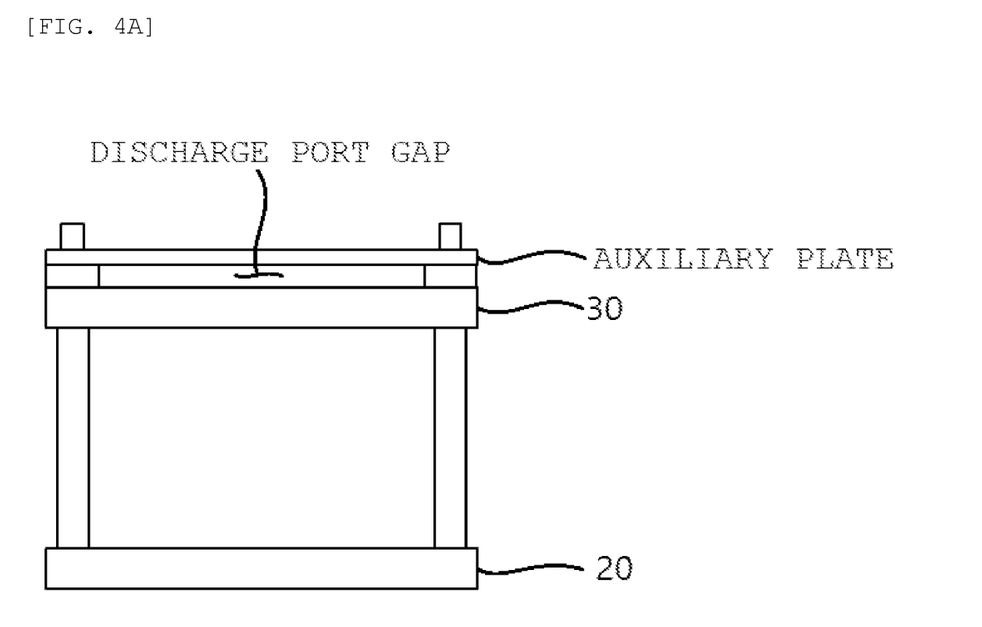
FIG. 4A is a cross-sectional view illustrating a jig for evaluating stability of a secondary battery according to another embodiment of the present invention.
Figure 4B:
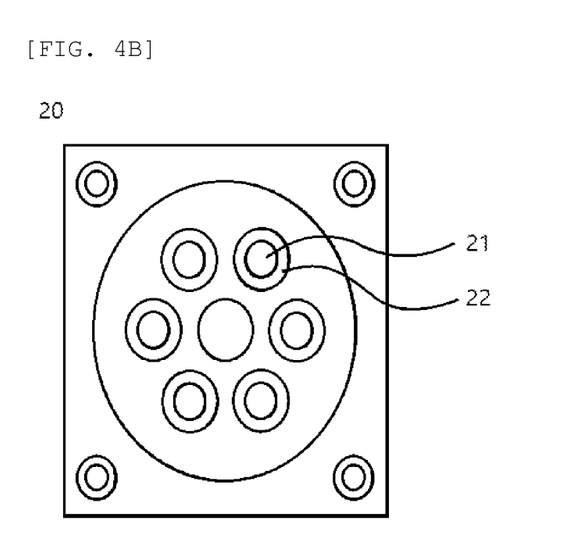
FIG. 4B is a top plan view illustrating a jig part of the jig for evaluating stability of a secondary battery according to another embodiment of the present invention.

FIG. 4B is a top plan view illustrating the jig part 20 of the jig 100 for evaluating stability of a secondary battery according to another embodiment of the present invention. The jig 100 for evaluating stability of a secondary battery according to another embodiment of the present invention may evaluate stability of the plurality of cells 200. In this case, the jig part 20 may include the one or more first terminal pins 21 and the one or more second terminal pins 22, and the single plate 30 may include the one or more ignition discharge ports 31.

The jig 100 for evaluating stability of a secondary battery according to the present invention may further include the mounting part 10.

The mounting part 10 may come into contact with at least a part of the cell and support the cell. In the embodiment, the mounting part 10 may be provided in a shape made by cutting an external shape of the cell 200 in the axial direction. Therefore, the mounting part 10 may at least partially come into contact with the lateral surface of the cell 200 and support the cell 200. In this case, the lateral surface of the cell 200 may be a surface, among three or four surfaces constituting the cell 200, except for surfaces positioned at upper and lower sides based on the axial direction. For example, when the cell 200 is a cylindrical secondary battery, the mounting part 10 may have a semi-cylindrical structure made by cutting a cylindrical shape in the axial direction once.

The jig 100 for evaluating safety of the secondary battery according to the present invention may further include a connection part 50. The connection part 50 may be coupled to a part of the jig part 20 and electrically connect a safety evaluation apparatus and the cell or the jig part 20. That is, the connection part 50 may be connected to a conductive wire included in the stability evaluation apparatus to electrically connect the cell and the stability evaluation apparatus.

The connection part 50 may include one or more conductive wires therein. Further, the connection part 50 may include a connecting part (not illustrated) protruding from one side of the connection part 50 to connect the conductive wire of the safety evaluation apparatus to the conductive wire included in the connection part 50.

The connection part 50 may include one of or both a first terminal pin connection part 51 and a second terminal pin connection part 52.

The first terminal pin connection part 51 may be connected to the first terminal pin 21 by means of the conductive wire and include a first connecting part provided on one surface thereof. The second terminal pin connection part 52 may be connected to the second terminal pin 22 by means of the conductive wire and include a second connecting part provided on one surface thereof. Further, the first terminal pin connection part 51 and the second terminal pin connection part 52 may be connected to the lateral and upper surfaces of the jig part 20. For example, the first terminal pin connection part 51 may be connected to a part of the lateral surface of the jig part 20, and the second terminal pin connection part 52 may be connected to the upper surface of the jig part 20.

A method of evaluating stability of a secondary battery according to the present invention includes step S1 of mounting and supporting the cell on the mounting part and the plate positioned at one side of the mounting part and then bringing one side of the cell into contact with the terminal pins of the jig part, step S2 of charging and discharging the cell, and step S3 of evaluating safety of the cell.

Step S1 of bringing the one side of the cell into contact with the terminal pins of the jig part may include bringing the positive and negative electrode terminal parts provided at one side of the cell into contact with the first and second pin terminals of the jig part. Further, the position of the plate may be adjusted, and the cell and the terminal pins may come into contact with one another. In other words, the plate may move upward or downward in the axial direction of the cell. When the plate moves upward, the cell and the jig part come into contact with each other. When the plate moves downward, the cell and the jig part may be separated from each other. In this case, the term "upward" may mean a direction in which the jig part is positioned in the axial direction of the cell. Step S2 of charging and discharging the cell is a step of electrically connecting the jig part and a charging/discharging apparatus and applying electric current to the cell. Further, step S2 of charging and discharging the cell may include step S2-1 of discharging flame and heat to the outside. A thermal runaway may occur at the time of charging or discharging the cell multiple times, which may cause flames. In this case, flame and heat may be discharged to the outside.

Step S3 of evaluating safety of the cell is a step of charging and discharging the cell multiple times and then evaluating an internal temperature of the cell, a degree of expansion of the cell, a degree of a decrease in efficiency of the cell, and the like.

While the present invention has been described above with reference to the exemplary embodiments, it may be understood by those skilled in the art that the present invention may be variously modified and changed without departing from the spirit and scope of the present invention disclosed in the claims.

MODE FOR INVENTION

Experimental Example 1

The electric currents applied to the cells when the secondary batteries were repeatedly charged and discharged to evaluate stability were compared.

Comparative Examples

In Comparative Examples, the evaluation of safety of the secondary battery was performed by using the electrode assembly to which the electrode tab is welded. The negative and positive electrode tabs were brought into contact with and electrically connected to the negative electrode terminal pin and the positive electrode terminal pin of the jig for evaluating safety of a secondary battery, and the secondary battery was repeatedly charged and discharged multiple times.

Examples

An electrode assembly, which had upper and lower portions with which an internal terminal was in contact without including an electrode tab, was accommodated in a can, the can was sealed by an external terminal, and then a secondary battery was repeatedly charged and discharged by using the jig for evaluating safety of a secondary battery. A negative electrode terminal part and a positive electrode terminal part of the external terminal was brought into contact with a negative electrode terminal pin and a positive electrode terminal pin of the jig for evaluating safety, and electric current was applied.

Figure 5A:
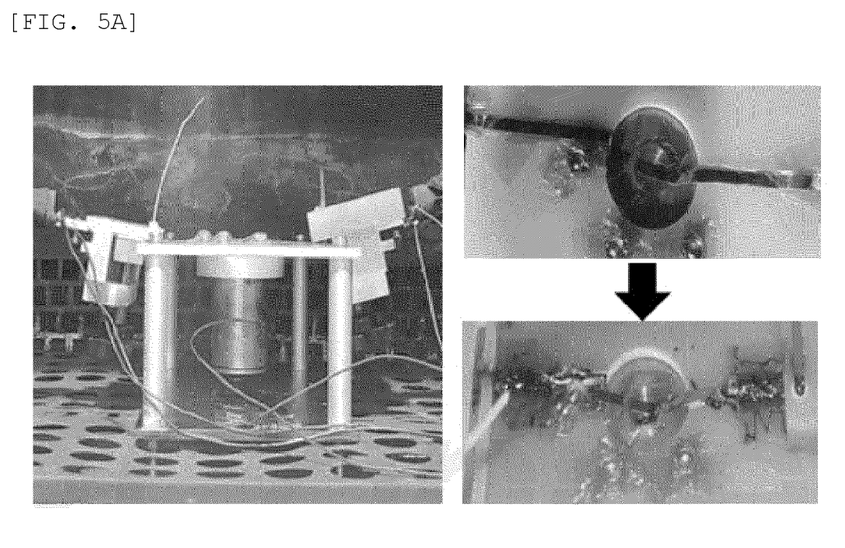
FIG. 5A is a photograph illustrating that a comparative example is installed on the jig for evaluating safety of a secondary battery.
Figure 5B:
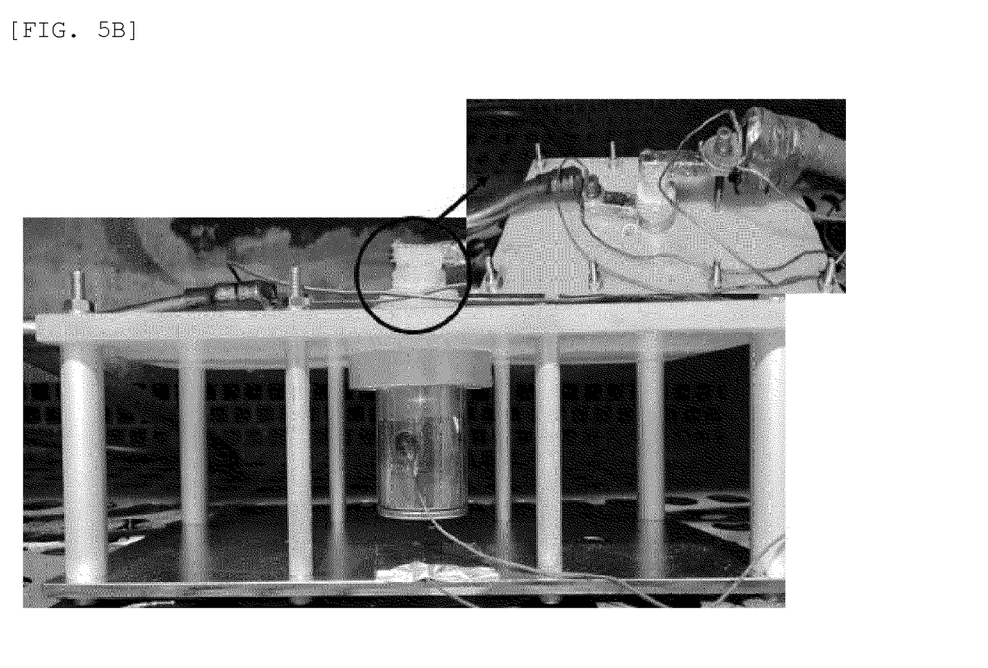
FIG. 5B is a photograph illustrating that an example is installed on the jig for evaluating safety of a secondary battery.
Figure 6A:
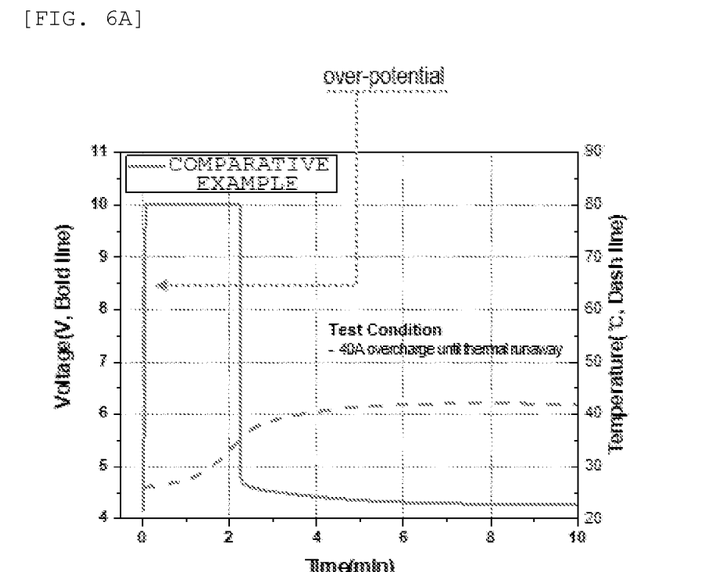
FIG. 6A is a graph illustrating a result of measuring current applied over time according to the comparative example.
Figure 6B:
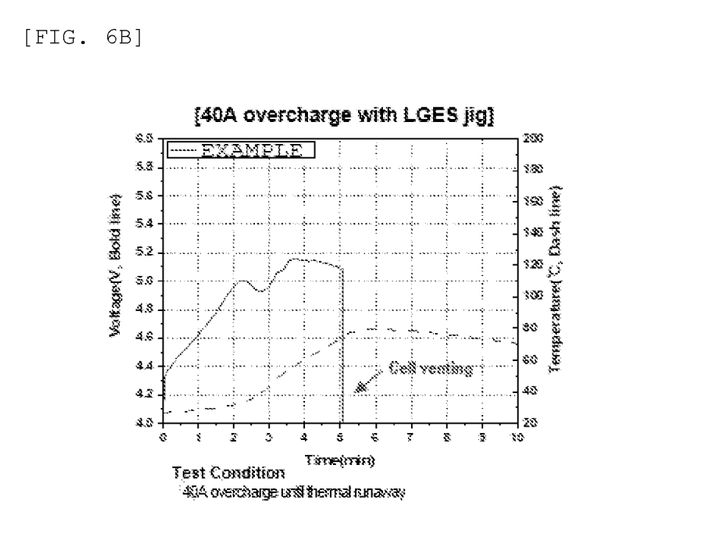
FIG. 6B is a graph illustrating a result of measuring current applied over time according to the example.

FIG. 5A is a photograph illustrating that a comparative example is installed on the jig for evaluating safety of a secondary battery, FIG. 5B is a photograph illustrating that an example is installed on the jig for evaluating safety of a secondary battery, FIG. 6A is a graph illustrating a result of measuring current applied over time according to the comparative example, and FIG. 6B is a graph illustrating a result of measuring current applied over time according to the example.

The electrode assemblies of the comparative example and the example may have the same capacity and size. As the capacity and size of the secondary battery increase, a size of the tab, such as a thickness, material, length, or the like of the tab needs to be adjusted.

Referring to FIG. 6A, it can be seen that in the comparative example, the applied current is increased to the upper limit electric current of the apparatus within a short time. This is because the tab, which is not suitable for the secondary battery having a large capacity, is welded, the applied current increases, and the tab is disconnected because of heat caused by the increase in applied electric current.

Referring to FIG. 6B, in the example, the applied current does not rapidly increase to the upper limit electric current of the apparatus even though the applied current increases. Because the electrode assembly having a structure having no electrode tab is used, a problem of disconnection of the electrode tab or deterioration in weldability does not occur.

Experimental Example 2

One cell among a plurality of cells was ignited, and the presence or absence of chain ignition and side rupture of the cells adjacent to the ignited cell was measured with respect to an experimental environment and a discharge port gap. A jig for evaluating safety of a secondary battery, which was used in this case, was configured by including the auxiliary plate in the jig for evaluating stability of a secondary battery according to the present invention. The auxiliary plate was positioned to be spaced apart from the plate.

Comparative Example 1

In Comparative Example 1, six cells were mounted on the jig for evaluating safety of a secondary battery, and then the presence or absence of chain ignition and side rupture was measured by using the jig for evaluating safety of a secondary battery in which a distance (discharge port gap) between the plate and the auxiliary plate was 1 mm. Further, in Comparative Example 1, an internal temperature of the jig was maintained to be 20 degrees by introducing a cooling fluid into the jig for evaluating safety of a secondary battery.

Comparative Example 2

In Comparative Example 2, six cells were mounted on the jig for evaluating safety of a secondary battery, and then the presence or absence of chain ignition and side rupture was measured by using the jig for evaluating safety of a secondary battery in which a distance between the plate and the auxiliary plate was 1 mm. In Comparative Example 2, the internal temperature of the jig for evaluating safety was set to be equal to the outside temperature by discharging ignition heat to the outside through the ignition discharge port and the discharge port gap.

Examples

Six cells were mounted on the jig for evaluating safety of a secondary battery, and then the presence or absence of chain ignition and side rupture was measured by using the jig for evaluating safety of a secondary battery that does not include an auxiliary plate.

TABLE 1

|  | Experimental Environment | Classification |  | Presence or absence of chain ignition | Presence or absence of side rupture | Flame (500° C.) duration |
|---|---|---|---|---|---|---|
| Comparative Example 1 | Maintain temperature in jig at 20° C. | Discharge port gap | 1 mm | ○ | ○ | 45 s |
|  |  | Adjacent cells | 6 EA |  |  |  |
| Comparative Example 2 | Outside | Discharge port gap | 1 mm | ○ | X | 40 s |
|  |  | Adjacent cells | 6 EA |  |  |  |
| Example 2 | Outside | Discharge port gap | Absence | X | X | 5.5 s |
|  |  | Adjacent cells | 6 EA |  |  |  |

Referring to Table 1, it can be seen that in Comparative Examples 1 and 2, the chain ignition occurs when a size of the discharge port gap is 1 mm regardless of an experimental environment. It can be seen that in Comparative Examples 1, ignition heat is generated in the jig in addition to the internal temperature (20° C.) of the jig, such that the chain ignition and side rupture occur in the adjacent cells.

It can be seen that in Comparative Examples 2, a side rupture of the cell does not occur because the ignition heat is discharged through the ignition discharge port and the discharge port gap without maintaining a temperature, but the chain ignition occurs because of a discharge speed of ignition heat is low.

In this case, the side rupture means that the lateral surfaces of the adjacent cells are ruptured by the ignition cell.

It can be seen that in Examples 1 and 2, the ignition discharge port is included in the plate in a state in which a size of the discharge port gap is 5 mm or more, such that the ignition heat is effectively discharged, and the flame duration is short. Therefore, it can be seen that the heat radiated from the ignited cell does not affect the adjacent cells, such that the chain ignition and the side rupture do not occur.

The invention claimed is:

1. A jig for evaluating stability of a battery cell, the jig comprising:
    a jig part comprising:
        first and second terminal pins configured to come into contact with external terminals of the battery cell; and
        a main body, at least one of the first and second terminal pins being configured to be separated from or coupled thereto; and
    a plate positioned to face the jig part and configured to support the battery cell,
    wherein the battery cell comprises:
        an electrode assembly made by winding a separator and electrodes;
        a can configured to accommodate the electrode assembly and opened at a first side thereof, the can having a through-hole at a second side thereof;
        a vent coupled to the first side; and
        a second electrode terminal coupled to the through-hole, the second electrode terminal being one of the external terminals, and
    wherein any one of the first and second terminal pins has a diameter equal to or smaller than a diameter of the second electrode terminal.

2. The jig of claim 1, wherein the external terminals of the battery cell include a positive electrode terminal part and a negative electrode terminal part, and
    wherein the first and second terminal pins are configured to come into contact with the positive electrode terminal part and the negative electrode terminal part of the battery cell, respectively.

3. The jig of claim 1, wherein the at least one of the first and second terminal pins is separated from and coupled to the main body in a screwed manner.

4. The jig of claim 1, wherein the plate comprises an ignition discharge port configured to discharge flame and heat therethrough.

5. The jig of claim 1, further comprising a plate controller configured to bring the battery cell into contact with the jig part or separate the battery cell from the jig part by adjusting a position of the plate.

6. The jig of claim 1, further comprising a connection part coupled to the jig part and configured to electrically connect the battery cell to a stability evaluation apparatus.

7. The jig of claim 6, wherein the connection part comprises at least one of a first terminal pin connection part connected to the first terminal pin of the jig part and a second terminal pin connection part connected to the second terminal pin of the jig part.

8. The jig of claim 1, wherein the plate is provided as a plurality of plates.

9. The jig of claim 1, further comprising a mounting part configured to come into contact with at least a part of the battery cell to support the battery cell.

10. The jig of claim 9, wherein the mounting part is configured to come into contact with at least a part of a lateral surface of the battery cell to support the battery cell.

11. A jig for evaluating stability of a battery cell, the jig comprising:
- a jig part including a single rigid main body;
- first and second terminal pins disposed on the main body in vertical alignment with external terminals of the battery cell, the first and second terminal pins being configured to come into contact with a positive electrode terminal part and a negative electrode terminal part of the battery cell in a vertical insertion direction during charging and discharging, wherein at least one of the first and second terminal pins is detachably coupled to the main body by a screw-thread engagement and has a diameter equal to or smaller than a diameter of the corresponding electrode terminal, thereby enabling stable and damage-free contact; and
- a plate disposed opposite the main body and configured to directly support a bottom surface of the battery cell during stability evaluation.

* * * * *